United States Patent [19]

Wilston

[11] Patent Number: 5,127,452
[45] Date of Patent: Jul. 7, 1992

[54] DOWEL MAKING MACHINE

[75] Inventor: Arthur L. Wilston, Troy, Pa.

[73] Assignee: Structural Block Systems, Inc., Troy, Pa.

[21] Appl. No.: 733,637

[22] Filed: Jul. 22, 1991

[51] Int. Cl.⁵ .......................... B23C 3/04; B23C 1/20; B27C 7/00
[52] U.S. Cl. ........................................ 142/40; 142/37; 142/54; 144/134 A; 144/134 B; 144/134 D; 409/167
[58] Field of Search .................. 142/1, 37, 40, 54, 31, 142/32; 144/12, 4, 134 R, 134 A, 134 B, 134 D; 409/165, 166, 167, 175, 182

[56] References Cited

U.S. PATENT DOCUMENTS

| 240,584 | 4/1881 | Elliott | 142/54 X |
| 1,744,697 | 1/1930 | Granger | 142/40 X |
| 2,715,924 | 8/1955 | Norris | 144/205 |
| 2,780,253 | 2/1957 | Joa | 144/246 |
| 3,234,974 | 2/1966 | Ray | 142/32 |
| 3,512,561 | 5/1970 | Cortez | 142/37 |
| 4,200,129 | 4/1980 | Sneed, Jr. | 142/56 |
| 4,460,532 | 7/1984 | Cornell | 264/163 |
| 4,553,575 | 11/1985 | Brown | 144/12 |
| 4,630,660 | 12/1986 | McGuire | 144/363 |
| 4,678,903 | 9/1988 | Merritt, Jr. | 144/134 D X |

Primary Examiner—Steven C. Bishop

[57] ABSTRACT

A hollow shaft, threaded on the interior, permits a workpiece, having a square cross section, to be rotated therein and thereby moved axially to be driven against a cutting edge to form the dowel.

6 Claims, 6 Drawing Sheets

DOWEL MAKING MACHINE

BACKGROUND OF THE INVENTION

This invention relates to a machine and method for making dowels and, more particularly, to a machine and method for simply making wood dowels.

There is a continuing need in carpentry and related fields for making dowels. It is particularly useful to be able to make dowels of varying sizes and shapes and contours. At the present time dowels are typically available only in fixed shapes and sizes and are produced usually be relatively expensive, complex machinery. This is not entirely satisfactory for those who require specially shaped or sized dowels or desire for some other reason to make their own. For this reason, a number of devices have been constructed to permit the hobbyist and others to make their own dowels.

One such device is that described in U.S. Pat. No. 4,553,575 issued to Brown. It comprises a stationery cutting tool having an internal bore and a cutting edge at one end of the bore. The cutting tool is held in a vice and a piece of wood stock having a rectangular cross section is driven (rotated) through the cutting edge by a hand held electric drill such that, as the rectangular stock passes through the cutting tool, the dowel is formed. While capable of forming dowels, this device is somewhat awkward to use, dangerous and permits only fixed size dowels to be formed, one for each cutting edge. No variation can be made in the dowel size by way of tapering and the like.

Another dowel forming device is that described in U.S. Pat. No. 2,715,924 issued to Norris. This device positions a work piece having a rectangular cross section in an elongated hollow sleeve and rotates the work piece such that the end thereof engages a circular saw blade which cuts the periphery of the work piece, thereby forming the dowel. This device also has many of the limitations of those previously described. It can only form one size dowel; it cannot be not tapered, contoured, and the like.

Still another dowel turning device is that described in U.S. Pat. No. 3,234,974 issued to Ray. This device comprises a square chuck, for holding the workpiece, which is mounted in an electric drill. The workpiece is rotated by the chuck and forced through a hollow cutting tool, which is hand held, to form a dowel. This device in addition to suffering the many limitations to those described above, also is limited in the size dowel that can be formed to the strength of one's hand for holding the cutting tool.

A final dowel making machine is that described in U.S. Pat. No. 4,630,660 issued to Maguire. In this device a square work piece is passed through a hollow rotatable work holder that also has formed on one end a cutting edge. The rotating piece is driven by a pulley or like device. As the work piece is forced actually along its axis through the rotatable cutter, the dowel is formed. Here again, the dowel can only be formed of one size, cannot be adjusted in shape or tapered and a relatively large amount of force is required to move the work piece through the cutting tool.

SUMMARY OF THE INVENTION

Many of the disadvantages of these prior art dowel making devices are overcome by the machine and method of this invention. According to the invention a dowel making machine is formed comprising a fixed hollow shaft defining an axis and having threads in the hollow portion; means to rotate an elongated workpiece having a generally square cross section about the axis to engage the threads and thereby move the workpiece along the axis, a cutting edge positioned along the axis adjacent the hollow shaft, thereby to engage and cut the workpiece into a dowel as the workpiece is rotatably passed through the hollow shaft.

With such a dowel making machine, dowels of varying sizes may be formed. The dowels may be tapered, contoured, stepped and the like as is desired by the maker. The machine is not only simple but is relatively inexpensive and easy to operate. The action of the threads greatly facilitates moving the workpiece through the machine to engage the cutting edge.

In a preferred embodiment of the invention, the cutting edge is a router and the machine includes means for adjustably mounting the router relative to the axis, thereby to permit adjustment of dowel diameter. Preferably the means to vary the adjustable mounting is a function of the workpiece position along the axis. The dowel configuration to be varied. The means to rotate the workpiece includes a drive member having a generally square base adapted to engage the workpiece. Further the drive member is mounted adjacent the hollow shaft by bearings. The rotating means may include a drive pulley mounting the drive member and means to drive the pulley. In its very simplest form the fixed hollow shaft may be no more than a female pipe coupling threaded in the interior.

According to a preferred method of making a dowel, this invention uses a fixed hollow shaft defining an axis and having threads in the hollow portion, and a cutting edge positioned along the axis adjacent the hollow shaft, and comprises the steps of positioning an elongated workpiece having a generally square cross section in the hollow shaft, and rotating the workpiece about the shaft axis, whereby the threaded hollow portion drives the workpiece against the cutting edge to form a dowel.

Using both the method and the machine of this invention relatively cheap dowels may be formed by the home hobbyist or professional carpenter, or, for that matter, a milling company.

BRIEF DESCRIPTION OF THE DRAWINGS

The invention may be more clearly understood by reference to the drawings in which like reference numbers represent like members.

DETAILED DESCRIPTION OF THE PREFERRED EMBODIMENT OF THIS INVENTION

Figure 1:
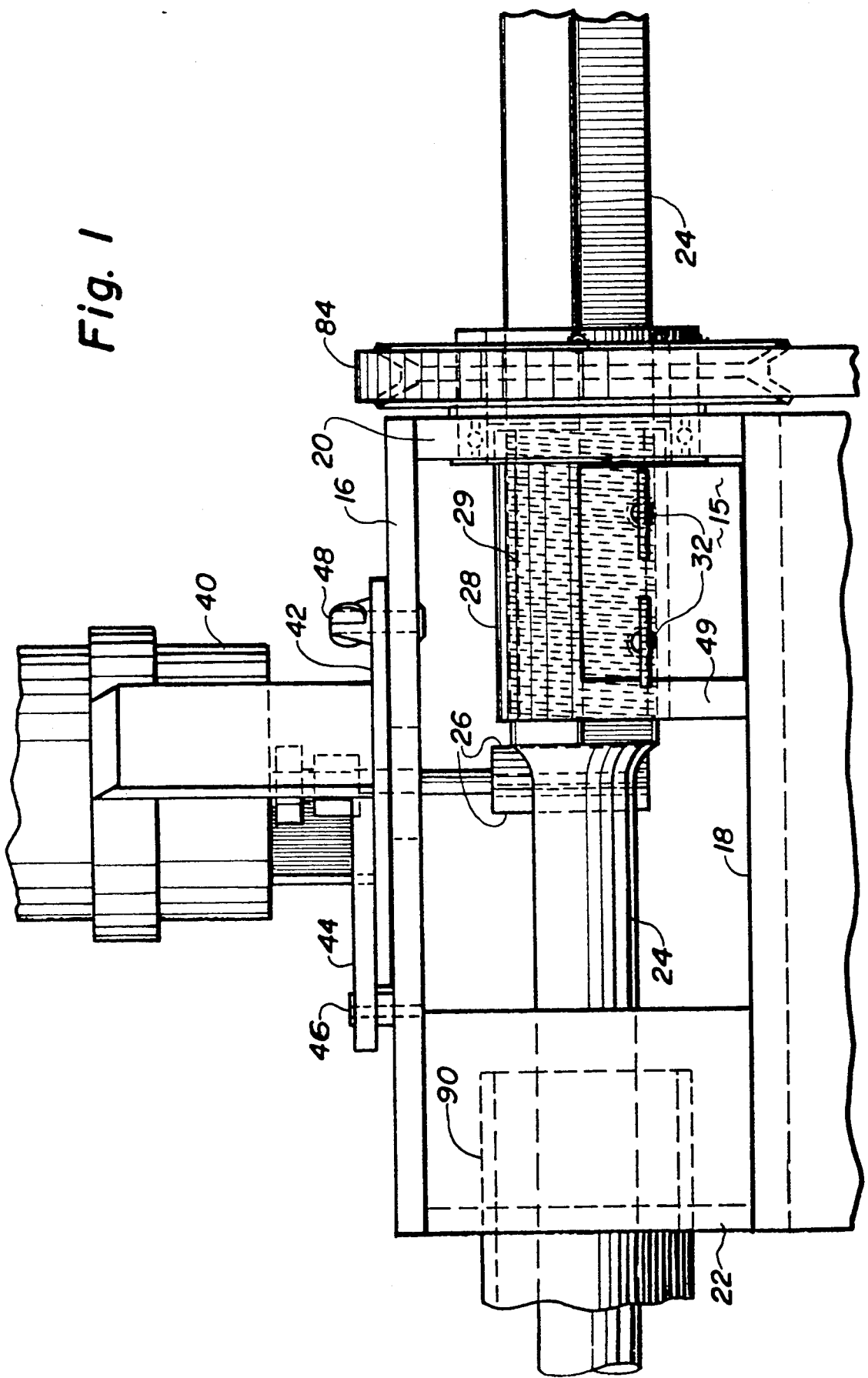
FIG. 1 is a side elevational view of an open side of the machine constructed in accordance with the preferred embodiment of this invention.
Figure 2:
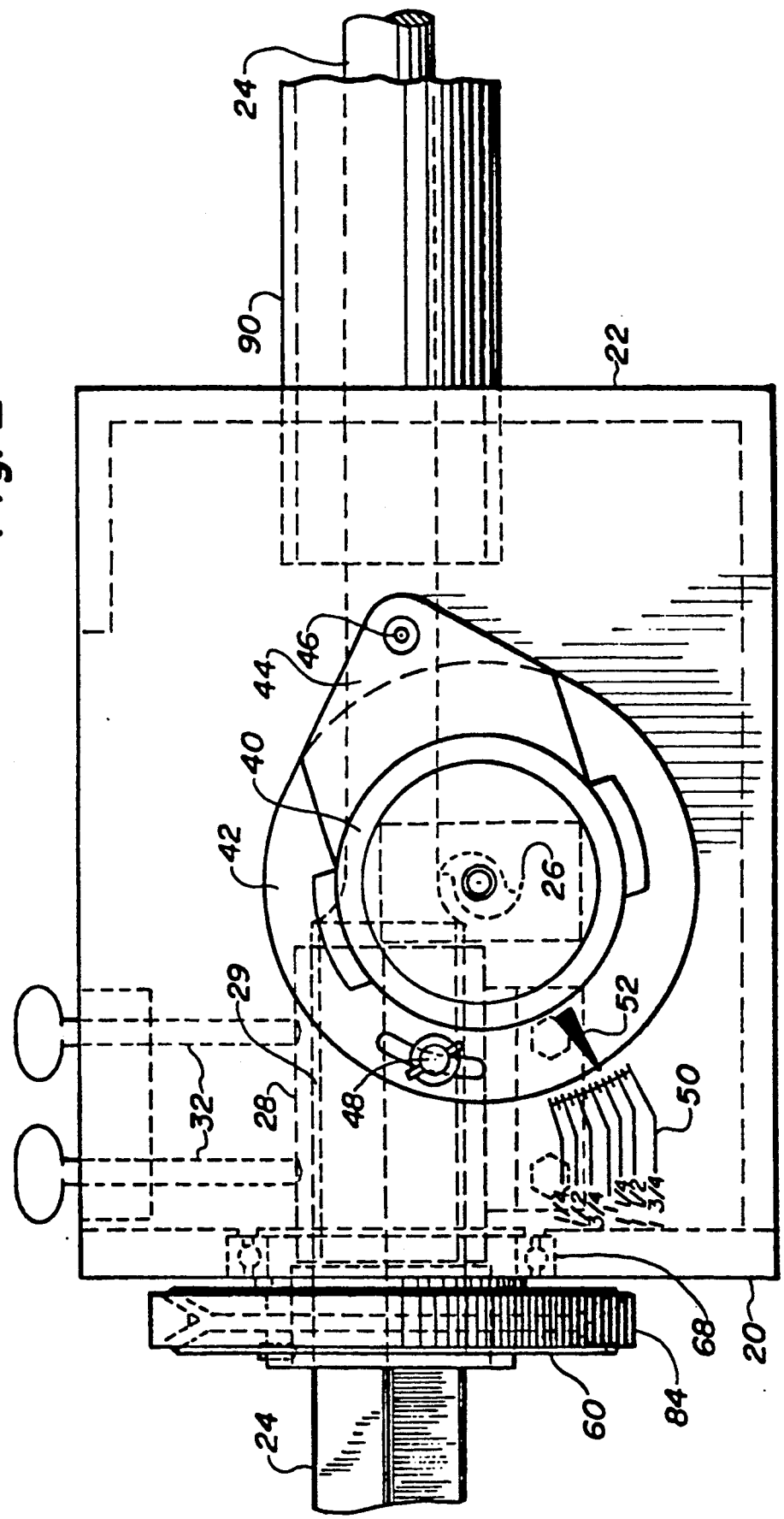
FIG. 2 is a plan view of the machine of FIG. 1 with the open frame side at the top of the drawing.
Figure 3:
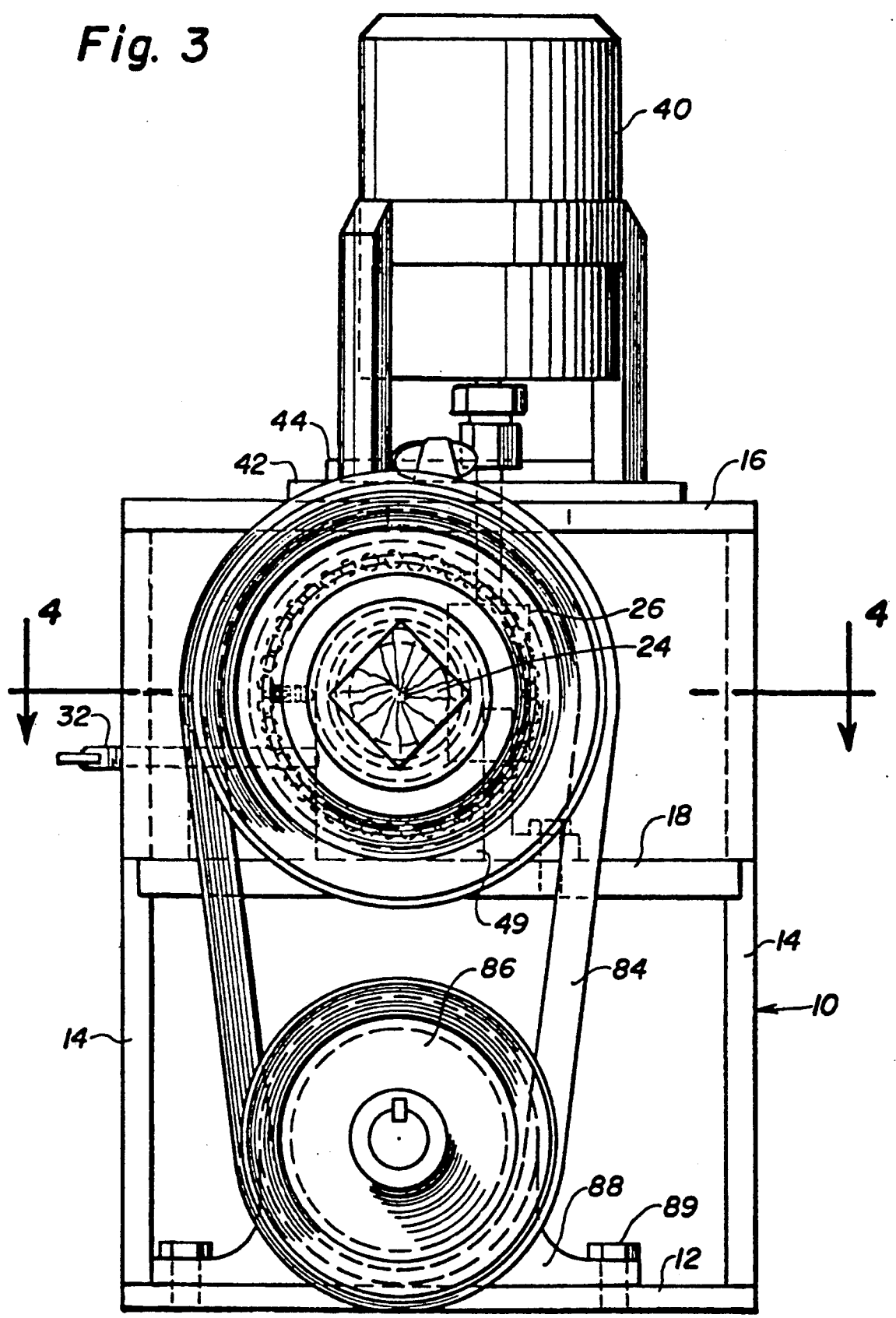
FIG. 3 is an end elevational view of the machine of FIG. 1 looking in the direction of material feed.
Figure 4:
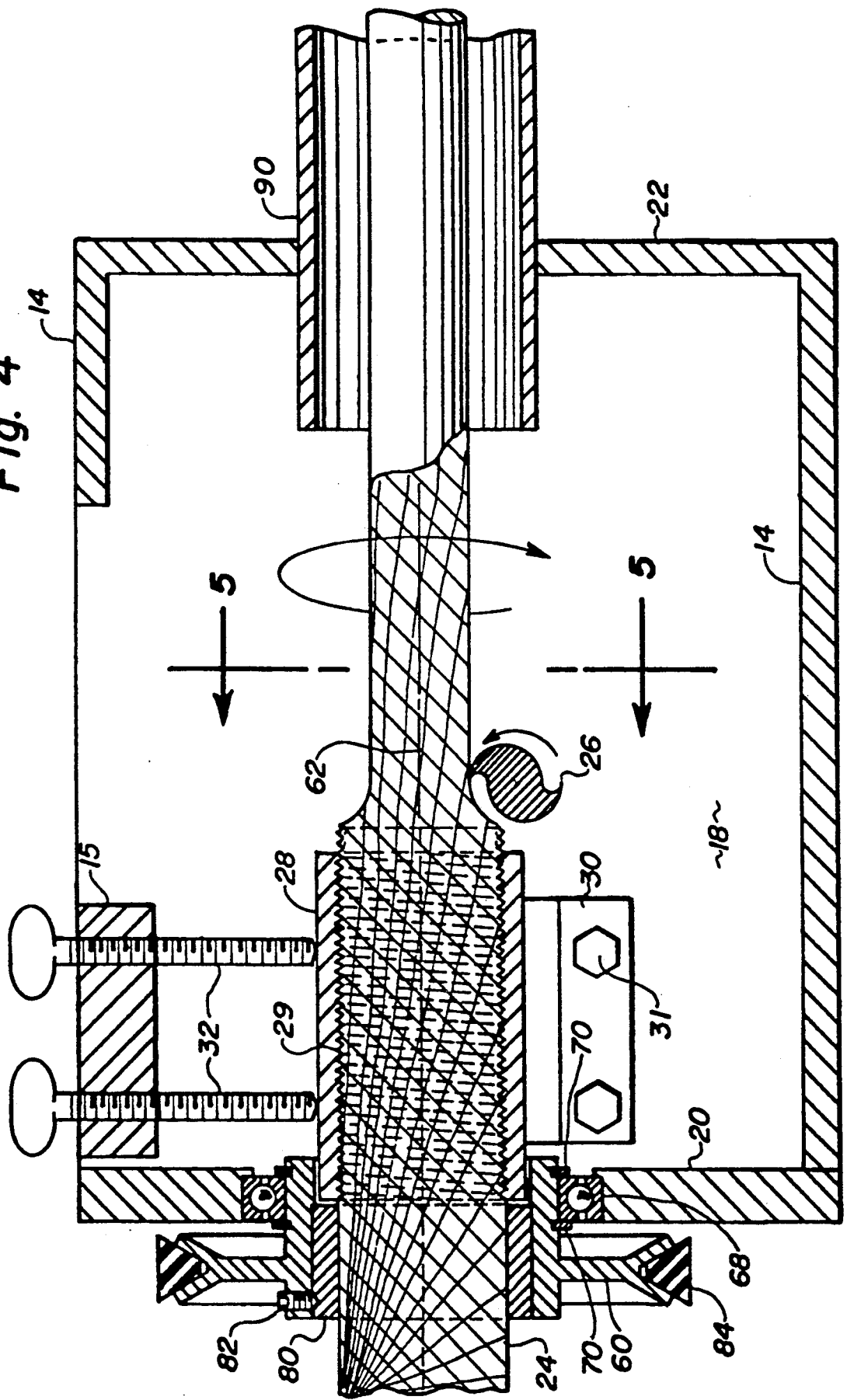
FIG. 4 is a horizontal sectional view of the machine of FIG. 1 taken along the lines 4—4 of FIG. 3.
Figure 5:
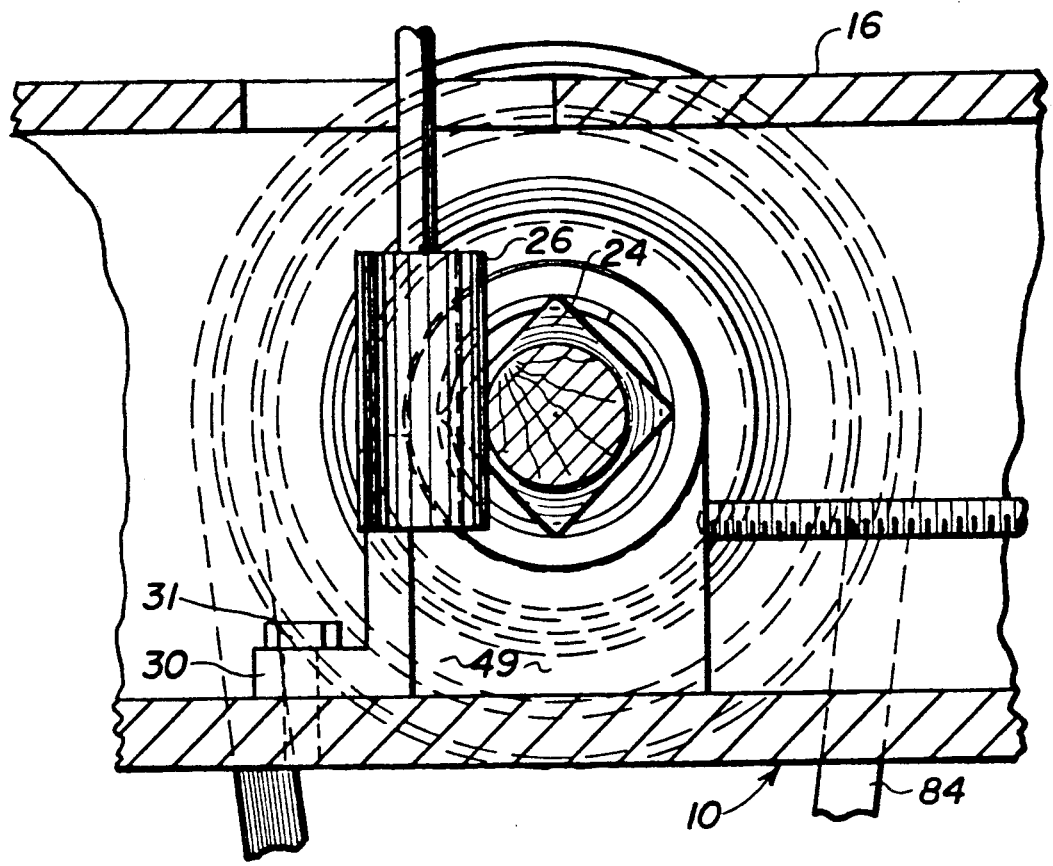
FIG. 5 is a vertical sectional view of the machine of this invention taken along the lines 5—5 of FIG. 4.

The dowel making machine of this machine may best be seen in FIGS. 1-5. The machine includes a fabricated housing 10 formed of steel or other suitable material having a base 12, sidewalls 14, a top plate 16 and an intermediate platform 18 mounted in slots formed in the sidewalls 14 for holding the dowel making machine itself. The housing also has endwalls 20 and 22 extending from the platform 18 to the top plate 16. The several walls and plates may be secured together as by welding, for example. The sidewall 14, in the upper portion of the drawing in FIG. 2 above the platform 18, is left open to permit access to the interior of the housing.

The drive portion of the machine, as will be described, moves a workpiece or material 24 against a cutting edge 26, which may be in the form of a router or other suitable cutting edge. In accordance with this invention, the mechanism which drives the material 24 against the cutting edge 26 is in the form of a fixed hollow shaft 28 which is of constant internal diameter and threaded on the interior with threads 29. In its simplest form, the shaft 28 may be a female pipe coupling. It is held in place by a bracket 30 attached to the platform 18 as by bolts 31 and held in position against the platform 18 and bracket 30 by adjustable screws 32 which engage a portion of a flange 15 secured to the platform 18. The shaft 28 may have a base portion 49 (FIG. 1) adapted to sit on the platform 18.

The cutting edge 26 typically is held by a router 40 which is mounted on the top plate 16 (FIG. 3) of the machine and extends down through an opening in the top plate to be positioned along the longitude axis 62 of the shaft 28 so it is able to engage material 24 which is passed therethrough. The router has a base 42 and a flanged piece 44 attached to the base 42 which engages a pivotal mount 46 (FIG. 2) thus permitting the router to be rotated about the pivotal mount 46. The amount of rotation is controlled by a clamp screw 48 attached to the top plate, which is seen most clearly in FIG. 2, may engage the base 42. An indicator 50 may be provided on the top plate 16 to provide an indication of the position of the router. The indicator may be calibrated to adjust the router to the size dowel desired. A pointer 52 on the base 42 indicates the position of the router relative to the axis 62 of the material.

A drive pulley 60 for the material is mounted along the rotational axis 62 of the material 24 and the shaft 28 to provide a mechanism for rotating the material 24 in the shaft 28. For this purpose, the pulley 60 is internally sleeved and provided with an end flange 66 to be positioned in a bearing 68 which is mounted in an end wall 20 of the machine. A pair of c-rings 70 engages an annular slot within the pulley sleeve and permits the pulley 26 to be clamped to the bearing 68.

A pulley insert 80 is fitted into the pulley sleeve and set its position by means of a set screw 82 in the sleeve. The insert 80 has a generally square cross section to accommodate the material 24 which is to be rotatably driven through the shaft 28 by rotation of the pulley. The pulley 60 has a drive belt 84 which engages a motor pulley 86 positioned on a motor 88 mounted by bolts 89 to the base 12. The insert 80 will have a square cross section slightly larger than the cross section of the material 24 but not as loose as to permit the material from slipping and not turning.

At the opposite end of the machine, the wall 22 is provided with a sleeve-like guide member 90 to accommodate the formed dowel and to permit its passage without undue wobbling through the machine. The member 90 should be slightly larger in diameter than the largest dowel to be formed.

In operation, a piece of elongated material having a square cross section to be formed into a dowel is inserted into the pulley insert 80 roughly the same square size as the material as described. The drive motor 88 is actuated so as to turn the pulley 60 and hence the material 24. The material 24 is sized to permit its four corners to engage the threads 29 of the shaft 28. As soon as the material engages the threads of the shaft 28, the outside corners of the material is engaged in the threads 29 and thereby moved axially by the rotating against the threads 29 along the axis 62 through the shaft 28 towards the cutting edge 26. It engages the cutting edge 26 as it moves thereby permitting material to be removed and forming the dowel. The dowel is permitted as it advances to pass through the guide member 90 on out to the outside of the machine.

A machine used in this manner is not only simple to operate but quite versatile. The sizes in the dowel may be adjusted up to the size of the material 24 simply by adjustment of the router position clamp screw 48. Although there is no actual limit on length of the shaft 28 that must be used, it is found quite adequate for most operation that it be in the neighborhood of approximately 10 centimeters in length which is typically the equivalent of two pipe couplings which may be substituted therefor. The simple rotational movement of the material 24 in the shaft 28 affords a very easy drive for engaging the router in a controlled manner.

Figure 6A:
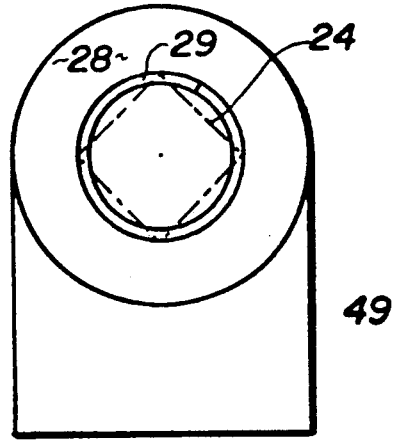
FIG. 6a and 6b are end elevational views of the fixed, threaded, material feed members for different square stock sizes of material.
Figure 6B:
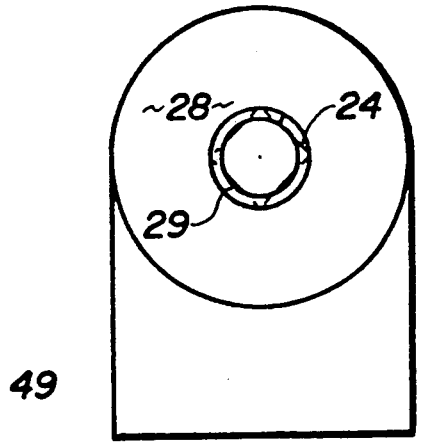
Figure 7A:
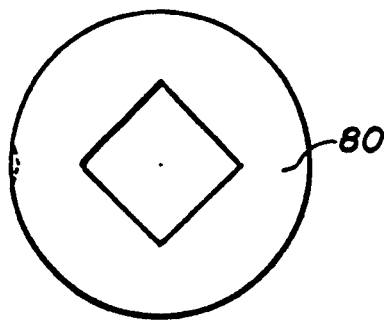
FIGS. 7a and 7b are elevational views of the pulley insert pieces for stocks of different sizes looking in the direction of material feed.
Figure 7B:
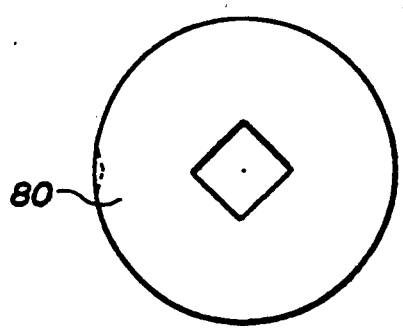

Different sized shafts 28 so as to accommodate different sized material 24 may be used as is illustrated in FIGS. 6a and 6b. The shafts illustrated there are for standard square stock wood 1¼ inches wide or ¾ inch wide. The illustration of FIGS. 1-5 typically is for material having a square cross section of 1¾ inch. Similarly, different drive inserts 80 for the pulley are used for the different sized materials. Thus FIG. 7a and 7b illustrate drive insert 80 for square stock of 1¼ × 1¼ or ¾ × ¾ inch respectively. In each case the shaft is positioned to accommodate the size material used. Recall the corners of the material 24 must engage the threads 29 of the shaft 28 to permit the shaft to be driven longitudionally against the cutters 26. The shaft 28 is removed simply by the use of the thumb screws 32 and the pulley insert changed simply by the use of the set screw 82.

Figure 8:
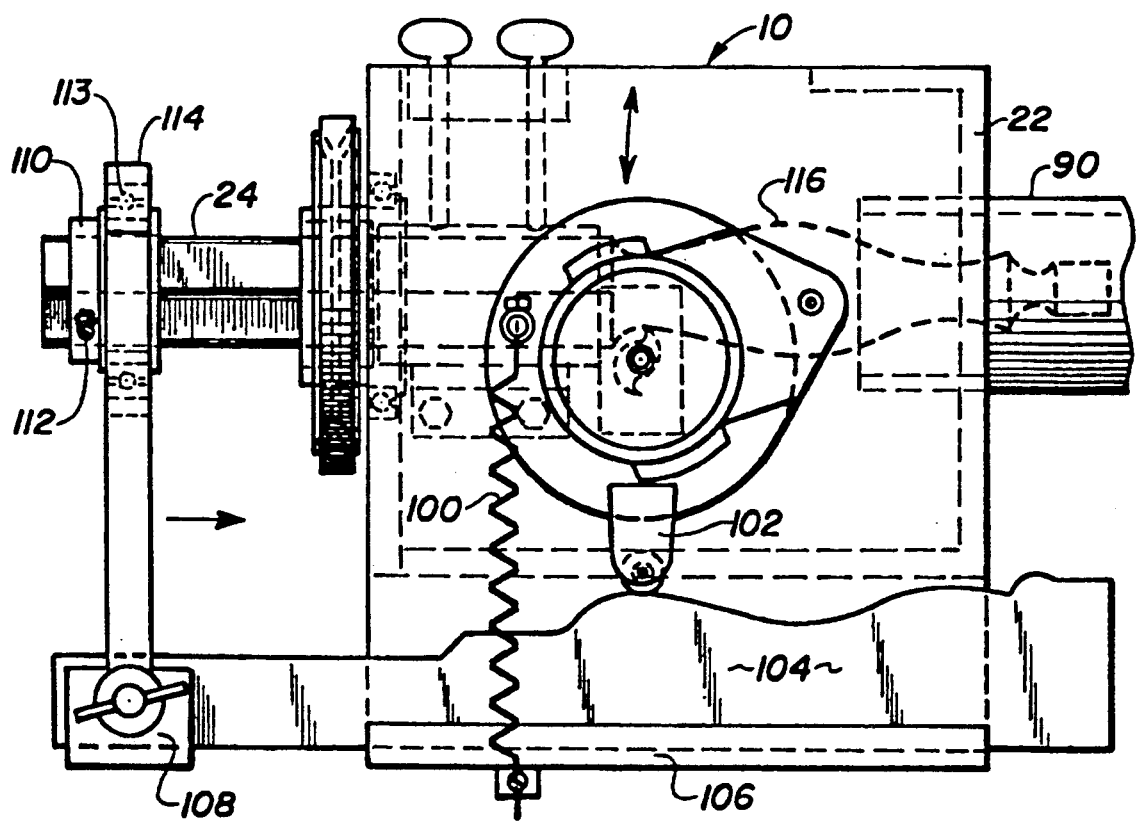
FIG. 8 is a top plan view similar to that of FIG. 2 but showing an embodiment of the invention including a complex shaping template for forming configured dowels.

In an alternative embodiment of the invention illustrated in FIG. 8, the machine of this invention may be coupled and used with a guide template to form dowels having various contour configurations. Thus with the housing 10 of FIGS. 1-5, the clamp screw 48 is removed and replaced by a spring 100 which is secured to the lower sidewall in FIG. 8 of the drawing. Furthermore, a cam follower 102 is secured to an edge of the baseplate 42 of the router 40 and positioned so as to engage a template 104 secured by a supporting bracket 106 attached to the side of the machine which permits the template 104 to slide within the bracket 106. The template is driven by a set screw clamp 108. A bearing 113 having an inner bore 110 which is square in shape and adapted to engage the workpiece 24 is clamped to the material by a screw 112. The bearing may have inserts similar to the insert 80 of FIG. 7a and b to accomodate different sized workpieces. A bearing outer race 114 has a clamp arm 115 attached to the bearing inner bore 110 and to clamp 108 and is thus driven by the movement of the material 24 axially through the shaft 28. The movement is such that the template 104 moves with the movement of the material and at the same rate as the movement of the material to provide a guide for the cam follower 102. Thus as the material 24 moves through the shaft 28 and is cut by the cutting edge 26, the position of the cutting edge is adjusted by the cam follower and template and positioned to form contours along the edges of the material as is seen by the illustration 116. The particular clamp configurations for the drive template are illustrative of many forms of this template drive that can be used instead. The use of the template is permitted by the facility of the machine design of this invention such that various sizes and types of dowel may be constructed at will without the need for changing cutting edges as is so necessary in the many devices of the prior art. The machine of this invention may be used with the several general typically standard size elongated pieces of wood which typically can come in sizes such as ¾×¾ inch; 1¼×1¼ inch; and 1¾×1¾ inch as described. Special sized pieces may be constructed for the sleeve 80 and shaft 28 if desired.

What is claimed:

1. A dowel making attachment for a router comprising, in combination:

a top plate with a work access hole, and first and second opposed side walls perpendicular to said top plate, said first side wall defining an aperture, a drive pulley rotatably mounted adjacent the aperture in said first side wall, said pulley having a axis of rotation, said pulley having a sleeve defining a bore extending through the pulley along the axis of rotation, drive means for rotating the pulley, a drive insert having a hollow square cross-section perpendicular to the axis of rotation replaceably positioned in the bore outside the first side wall for easy access and adapted to receive and engage an elongated workpiece having a generally square cross-section, a hollow driveshaft having internal threads and having a shaft axis lying on the axis of rotation, said hollow driveshaft being replaceably mounted, independent of said drive pulley and said first sidewall, thereby to facilitate replacement, to said attachment between said sidewalls adjacent said drive insert, a sleeve-like guide member positioned in the second guide wall to define an exit and support for the workpiece, the guide member positioned along the axis of rotation, said router having a cutting edge rotatably supported thereon, said router having a brace pivotably mounted to the top plate, said cutting edge extending through said work access hole, thereby to permit engagement with the workpiece extending through the drive insert driven along the axis of rotation by the hollow drive shaft, whereby the workpiece is formed into a dowel.

2. The attachment set forth in claim 1 which includes a thumbscrew secured to said top plate and adapted to adjustably engage said router base, thereby to facilitate adjustment of the position of cutting edge relative to the axis of the rotation.

3. The attachment set forth in claim 1 wherein the pulley sleeve defines a threaded base, and which includes a set screw engaging the bore to replaceably secure the drive insert, whereby the drive insert may be replaced easily.

4. The attachment set forth in claim 1 wherein the drive means includes a motor secured to the attachment, and which drive means has a pulley which rotates the drive pulley.

5. The attachment set forth in claim 1 wherein the drive insert cross-section has an inner dimension which is less than the internal diameter of the hollow shaft.

6. The attachment set forth in claim 1 wherein the hollow shaft is secured by a bracket secured to the attachment and a thumbscrew mounted on the attachment to engage the hollow shaft against the bracket.

* * * * *